US009115670B2

(12) United States Patent
Yamashita et al.

(10) Patent No.: US 9,115,670 B2
(45) Date of Patent: Aug. 25, 2015

(54) FUEL CONTROL METHOD FOR HAND-CARRIED ENGINE-DRIVEN WORKING MACHINE

(71) Applicants: IIDA DENKI KOGYO CO., LTD., Mitaka-shi, Tokyo (JP); ZAMA JAPAN CO., LTD, Hachimantai-shi, Iwate (JP)

(72) Inventors: Ryouhei Yamashita, Tokyo (JP); Akira Yamazaki, Tokyo (JP); Tamotsu Saitou, Hachimantai (JP); Hideki Watanabe, Hachimantai (JP); Takumi Nonaka, Hachimantai (JP)

(73) Assignees: IIDA DENKI KOGYO CO., LTD., Hachimantai (JP); ZAMA JAPAN CO., LTD., Tokyo (JP)

( * ) Notice: Subject to any disclaimer, the term of this patent is extended or adjusted under 35 U.S.C. 154(b) by 330 days.

(21) Appl. No.: 13/852,413

(22) Filed: Mar. 28, 2013

(65) Prior Publication Data

US 2013/0255629 A1 Oct. 3, 2013

(30) Foreign Application Priority Data

Mar. 29, 2012 (JP) .................................. 2012-76440

(51) Int. Cl.

| | |
|---|---|
| ***F02P 5/00*** | (2006.01) |
| ***F02M 3/00*** | (2006.01) |
| ***B60T 7/12*** | (2006.01) |
| ***F02M 17/00*** | (2006.01) |
| ***F02M 71/00*** | (2006.01) |
| *F02P 5/145* | (2006.01) |
| *F02D 41/00* | (2006.01) |
| *F02M 3/06* | (2006.01) |
| *F02D 41/08* | (2006.01) |

(52) U.S. Cl.

CPC ............... *F02M 17/00* (2013.01); *F02M 71/00* (2013.01); *F02D 41/0002* (2013.01); *F02D 41/08* (2013.01); *F02D 2041/001* (2013.01); *F02D 2200/0406* (2013.01); *F02M 3/062* (2013.01); *F02P 5/1455* (2013.01)

(58) Field of Classification Search

CPC ... F02D 37/02; F02D 2250/18; F02D 9/1055; F02D 41/083; F02D 2041/001; F02D 2200/0406; F02D 41/0002; F02D 41/08; F02D 2400/06; Y02T 10/42; F02P 5/1455; F02M 3/062

USPC ................. 123/319, 330–334, 339.1, 339.11, 123/339.12, 339.19, 339.22, 439, 680, 685, 123/457; 701/103, 104, 113

See application file for complete search history.

(56) References Cited

U.S. PATENT DOCUMENTS

2011/0004395 A1 1/2011 Neubauer et al.

FOREIGN PATENT DOCUMENTS

| | | |
|---|---|---|
| DE | 10 2009 031 707 A1 | 1/2011 |
| JP | A-2011-012685 | 1/2011 |

*Primary Examiner* — Lindsay Low
*Assistant Examiner* — Syed O Hasan
(74) *Attorney, Agent, or Firm* — Oliff PLC

(57) ABSTRACT

The opening of a solenoid valve is automatically adjusted after an engine is started and before actual work is performed for an appropriate air-fuel ratio, whereby it is possible to attain a good and stable driving of the engine without any delay even for an abrupt change in load. After the engine is started, when a rotation speed enters a “fuel flow rate adjusting rotation speed range” in which a definite load is applied to the engine in a working rotation speed range of the engine in which a throttle valve is opened to a definite opening, a detected rotation speed is fed back to a target rotation speed, and the opening of the solenoid valve is controlled to adjust a fuel flow rate, so that the combustion state in the engine is optimized at the valve opening so determined.

4 Claims, 6 Drawing Sheets

OPENING ADJUSTING PROCESS

BASIC ENGINE OPERATION FLOW

FUEL CONTROL METHOD FOR HAND-CARRIED ENGINE-DRIVEN WORKING MACHINE

BACKGROUND OF THE INVENTION

1. Field of the Invention

The present invention relates to an operation control method for a hand-carried engine-driven working machine such as lawn mower or a chain saw.

2. Description of the Related Art

In hand-carried engine-driven working machines which are currently marketed, carburetors of engines are adjusted to correct a variation in performance for optimum engine driving before shipment from an engine assembly plant.

Regardless of the adjustment made by manufacturers, the optimum fuel combustion within an engine varies depending on various conditions such as the temperature and atmospheric pressure in an environment where a working machine is used, the kind of fuel used, the running-in condition of the engine, and the condition of an air cleaner (that is, whether or not it is clogged), and consequently the optimum driving of the engine cannot be ensured any more, leading to a drawback of a deterioration of fuel economy, a reduction in output of the engine or an increase in exhaust emissions.

As a means for eliminating such a drawback, a user should adjust a needle valve of a carburetor for each work so as to control the supply of fuel for optimum combustion. However, an accurate adjustment of the needle valve requires skill of a high level and an exclusive facility. Namely, in the case of a normal engine, the user adjusts a needle valve of a carburetor while measuring the rotation speed of the engine to correct the air-fuel ratio which is changed by the working environment immediately after the engine is started. However, it is difficult to prepare a precision engine speed measuring device at an outside working site. Further, the vibration of the engine makes it difficult to precisely control the supply of fuel by rotating the needle valve accurately.

For example, Patent Literature 1 (JP-A-2011-012685) discloses a conventional technique which automatically controls a carburetor to properly deal with the change in working environment described above.

In the conventional technique described above, however, a relatively long period of time is necessary to stabilize the rotation speed of the engine, and hence, the conventional technique has a problem that it is not suitable for a case where the rotation speed of the engine changes due to an abrupt change in load in an actual working environment.

SUMMARY OF THE INVENTION

The present invention has been made with a view to solving the problem inherent in the related art. A technical problem that the invention is to solve is how to make a proper air-fuel ratio of the engine by automatically controlling an opening of a solenoid valve after the start of an engine and before the start of actual work. Then, an object of the invention is to attain a good and stable driving of the engine without any delay even for an abrupt change in load.

According to a first aspect of the invention, there is provided a fuel control method for a hand-carried engine-driven working machine having an assembly of an engine and a carburetor which are mounted on the hand-carried engine-driven working machine, the carburetor having a solenoid valve which is provided along a fuel line thereof to control a fuel flow rate within a working rotation speed range of the engine, the engine having a control unit provided therein to detect a rotation speed of the engine and control the driving of the solenoid valve, the fuel control method for the hand-carried engine-driven working machine comprising steps:

performing a "fuel flow rate adjusting process" (F.F.R.A.P.) to adjust a fuel flow rate which is caused to vary by an environment by changing the opening of the solenoid valve after the engine is stated and before actual work is performed;

in this "fuel flow rate adjusting process" (F.F.R.A.P.), with the engine operated under a definite load and at a definite throttle opening, when a detected rotation speed which is the current rotation speed enters within a "fuel flow rate adjusting rotation speed range" (F.F.R.A.R.S.R.) which is set for adjusting the fuel flow rate within the working rotation speed range, adjusting the opening of the solenoid valve by feeding back the detected rotation speed so that the detected rotation speed becomes a target rotation speed which is predetermined as a rotation speed corresponding to an air-fuel ratio expected in that state, and when the detected rotation speed stays, for a definite number of turns of the engine or for a period time, within a "fuel flow rate adjustment completion speed range" (F.F.R.A.C.S.R.) which is predetermined within the "fuel flow rate adjusting rotation speed range" (F.F.R.A.R.S.R.), determining the opening of the solenoid valve to be an "adjustment completion opening" (A.C.O.); and performing actual work at the obtained "adjustment completion opening" (A.C.O.) after completing the "fuel flow rate adjusting process" (F.F.R.A.P.).

By using a voltage generated in charging coils as the result of rotating of flywheel which incorporates permanent magnets, the control unit of the engine detects the rotation speed of the engine, and utilizes electric power generated as driving energy for driving either a microcomputer incorporated therein or the solenoid valve.

The user of the working machine starts the engine to warm it up and performs the "fuel flow rate adjusting process" (F.F.R.A.P.) for adjusting the flow rate of the carburetor according to an environment where the working machine is used. The adjustment of the fuel flow rate is performed in the "fuel flow rate adjusting rotation speed range" (F.F.R.A.R.S.R.) including the target rotation speed which is set within the working rotation speed range under a highly repeatable operating condition in which the engine is operated under a definite load (for example, no-load) and a definite throttle opening (for example, full throttle opening). The control unit automatically adjusts the opening of the solenoid valve so that the detected rotation speed of the engine which is then rotating becomes equal to the predetermined target rotation speed.

By performing the "fuel flow rate adjusting process" (F.F.R.A.P.) on the solenoid valve, the rotation speed of the engine is controlled. However, the opening of the solenoid valve immediately after the engine is started is a waiting opening which is the "adjustment completion opening" (A.C.O.) of the previous (last, most recent) operation, and the fuel flow rate changes depending upon the environment where the working machine is used or the kind of fuel used. A proper opening which results by adjusting the waiting opening through the "fuel flow rate adjusting process" (F.F.R.A.P.) is determined to be the "adjustment completion opening" (A.C.O.).

In this "fuel flow rate adjusting process" (F.F.R.A.P.), when the detected rotation speed of the engine which is operating continues to stay within the "fuel flow rate adjustment completion speed range" which is a speed range having a definite width including the target rotation speed, for the definite period of time or for the definite number of turns of the engine by which it can be determined that the engine is operating stably, the adjustment of the solenoid valve is configured to be completed.

According to a second aspect of the invention, in addition to the configuration of the first aspect of the invention, there is provided a configuration in which when the detected rotation speed deviates from the target rotation speed in the actual work, the opening of the solenoid valve is adjusted to an opening which results from adding to the "adjustment completion opening" (A.C.O.) which is obtained in the "fuel flow rate adjusting process" (F.F.R.A.P.) a "correction opening" (C.O.) which is determined from both of the "adjustment completion opening" (A.C.O.) and the detected rotation speed.

When the "fuel flow rate adjusting process" (F.F.R.A.P.) is completed to determine the "adjustment completion opening" (A.C.O.) and the working machine comes to be used in the actual work, the rotation speed of the engine changes largely within the working rotation speed range as a result of various loads being applied thereto. For example, the rotation speed changes when the clutch is engaged and a tool coupled to the working machine is driven to operate. At this time, there may be caused a situation in which a desired air-fuel ratio cannot be attained over the whole of the working rotation speed range only with the "adjustment completion opening" (A.C.O.) of the solenoid valve. To deal with this, the "correction opening" (C.O.) which is determined from both of the "adjustment completion opening" (A.C.O.) obtained in the "fuel flow rate adjusting process" (F.F.R.A.P.) and the changed rotation speed (the detected rotation speed detected then) is added to the "adjustment completion opening" (A.C.O.). Then, the opening of the solenoid valve is set to the value of the sum of the "adjustment completion opening" (A.C.O.) and the "correction opening" (C.O.) then, whereby the proper air-fuel ratio can be obtained according to the changed rotation speed to be detected.

According to a third aspect of the invention, in addition to the configuration of the first aspect of the invention, there is provided a configuration in which a temperature sensor for detecting the temperature of the engine is provided, and when it is determined from a value of the detected temperature detected by this temperature sensor that the engine is in a warm-up condition, as a result of the adjustment, in which the engine operates stably, the "fuel flow rate adjusting process" (F.F.R.A.P.) is configured to be completed.

In the configuration in which the adjustment is completed by determining from the value of the temperature detected by the temperature sensor that the engine is in the warm-up condition, it is possible to determine on the warm-up condition of the engine in an ensured fashion, thereby making it possible to determine on a stable operating state of the engine accurately.

According to a fourth aspect of the invention, in addition to the configuration of the first aspect of the invention, there is provided a configuration in which the adjusting state of the "fuel flow rate adjusting process" (F.F.R.A.P.) is indicated by an indicator such as a lamp.

In the configuration in which the adjusting state of the "fuel flow rate adjusting process" (F.F.R.A.P.) is indicated by the indicator such as the lamp, whether or not the opening of the solenoid valve is being adjusted in the hand-carried engine-driven working machine can be judged from a glance at the indicator.

The invention is configured as described above, and therefore, the following advantages are provided.

According to the configuration of the first aspect of the invention, the engine can be operated with the good combustion over the working rotation speed range by adjusting the opening of the solenoid valve, and therefore, it becomes possible to adjust easily the fuel flow rate to the optimum value, whereby the engine can be operated with good fuel consumption efficiency.

The "fuel flow rate adjusting process" (F.F.R.A.P.) is completed on condition that the detected rotation speed continues to stay within the "fuel flow rate adjustment completion speed range" for the definite period of time or for the definite number of turns of the engine. Therefore, the engine is allowed to operate stably at the detected rotation speed, whereby the engine is allowed to operate with the preferred air-fuel ratio.

According to the configuration of the second aspect of the invention in which when the detected rotation speed deviates from the target rotation speed in the actual work, the opening of the solenoid valve is adjusted to the opening which results from adding to the "adjustment completion opening" (A.C.O.) which is obtained in the "fuel flow rate adjusting process" (F.F.R.A.P.) the "correction opening" (C.O.) which is determined from both of the "adjustment completion opening" (A.C.O.) and the detected rotation speed, the appropriate solenoid valve opening is set for each rotation speed within the working rotation speed range. This enables the engine to operate with the optimum air-fuel ratio over the whole of the working rotation speed range, and therefore, the engine is allowed to operate reliably and stably.

According to the configuration of the third aspect of the invention in which the adjustment is completed by determining from the value of the temperature detected by the temperature sensor that the engine is in the warm-up condition, it is possible to determine on the stable operating state of the engine accurately. Thus, it is possible to end the "fuel flow rate adjusting process" (F.F.R.A.P.) more accurately and safely.

According to the configuration of the fourth aspect of the invention in which the adjusting state of the "fuel flow rate adjusting process" (F.F.R.A.P.) is indicated by the indicator such as the lamp, it can be judged from a glance at the indicator the state of the "fuel flow rate adjusting process" (F.F.R.A.P.) in which the opening of the solenoid valve is being adjusted in the hand-carried engine-driven working machine, therefore, the hand-carried engine-driven working machine can be handled in a safe fashion.

DETAILED DESCRIPTION OF THE INVENTION

Hereinafter, an embodiment of the invention will be described by reference to the drawings.

Figure 1:
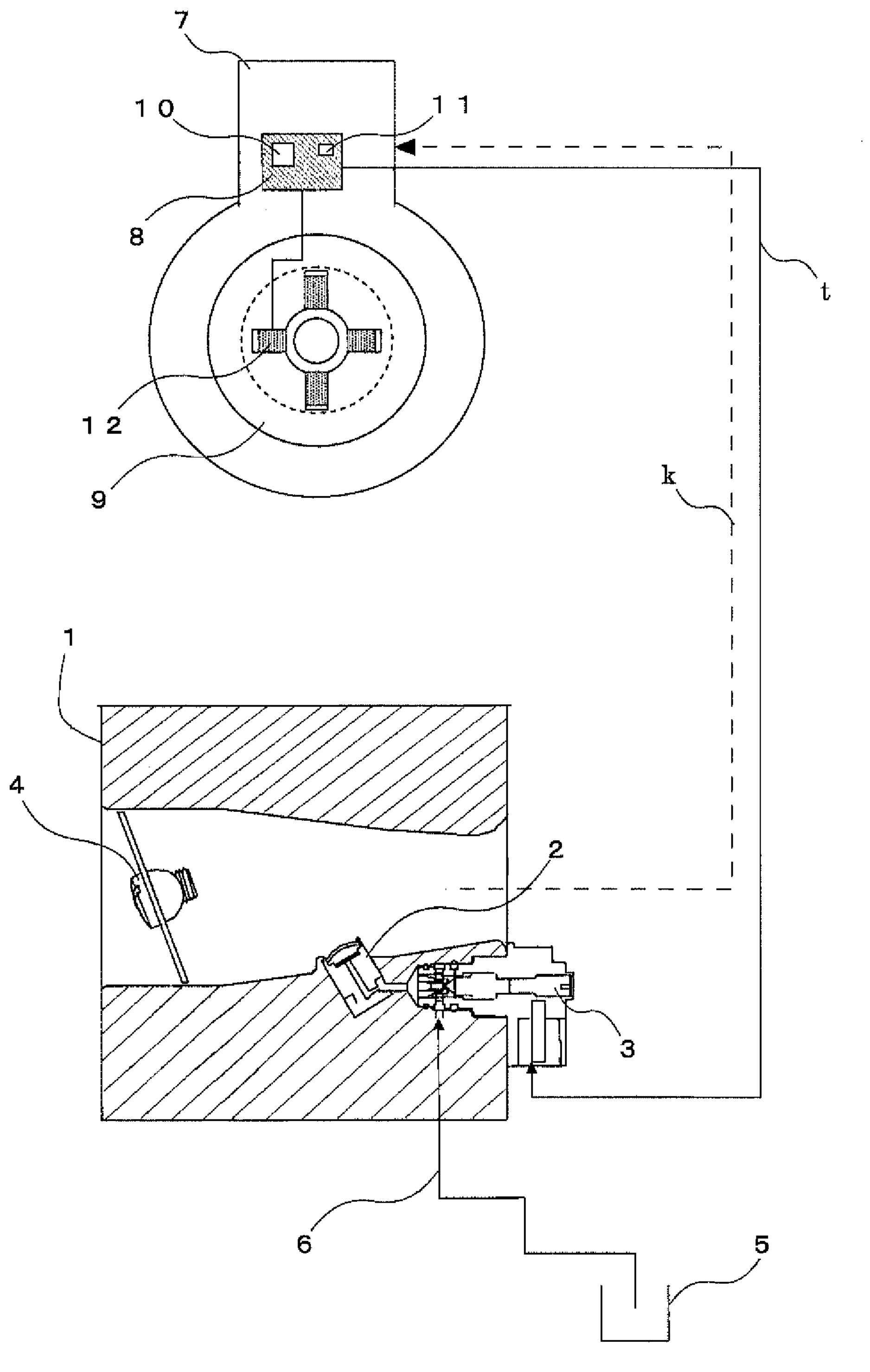
FIG. 1 is a schematic diagram which illustrates an assembly in accordance with an embodiment of the invention.

In FIG. 1, in an engine 7, by utilizing permanent magnets and charging coils 12 incorporated in a flywheel 9, an electric power is generated for inducing an electric spark in a spark plug and performing various controls in a microcomputer in a control unit 8. In addition, the electric power is also used for detecting a rotation speed of the engine 7 and driving a solenoid valve 3. The microcomputer in the control unit 8 detects a time per revolution and stores rotation speed data while the engine 7 is revolving.

In a carburetor 1, the solenoid valve 3 is connected between a measuring chamber and a main nozzle 2 and increases or decreases fuel to be supplied in response to a valve driving signal "t" from the control unit 8 to change the rotation speed of the engine 7. The solenoid valve 3 is connected to a fuel tank 5 via a fuel supply line 6. Reference numeral 4 denotes a throttle valve. Intake air "k" which is an air-fuel mixture produced in the carburetor 1 is supplied into cylinders of the engine 7.

In accordance with the invention, a temperature sensor 10 for detecting the temperature of the engine 7 and an indicator 11 for indicating the state of adjustment by a LED lamp are mounted in the control unit 8 which incorporates the microcomputer (whose illustration is omitted). In the embodiment shown in FIG. 1, the temperature sensor 10 enables an accurate and efficient detection of the rotation speed (a mean rotation speed) within a working rotation speed range in a proper warmed state. The indicator 11 enables a clear and accurate recognition of, for example, the completion of an "adjustment" by the invention, whereby a working machine can be handled in a safe and error-less fashion.

Figure 2:
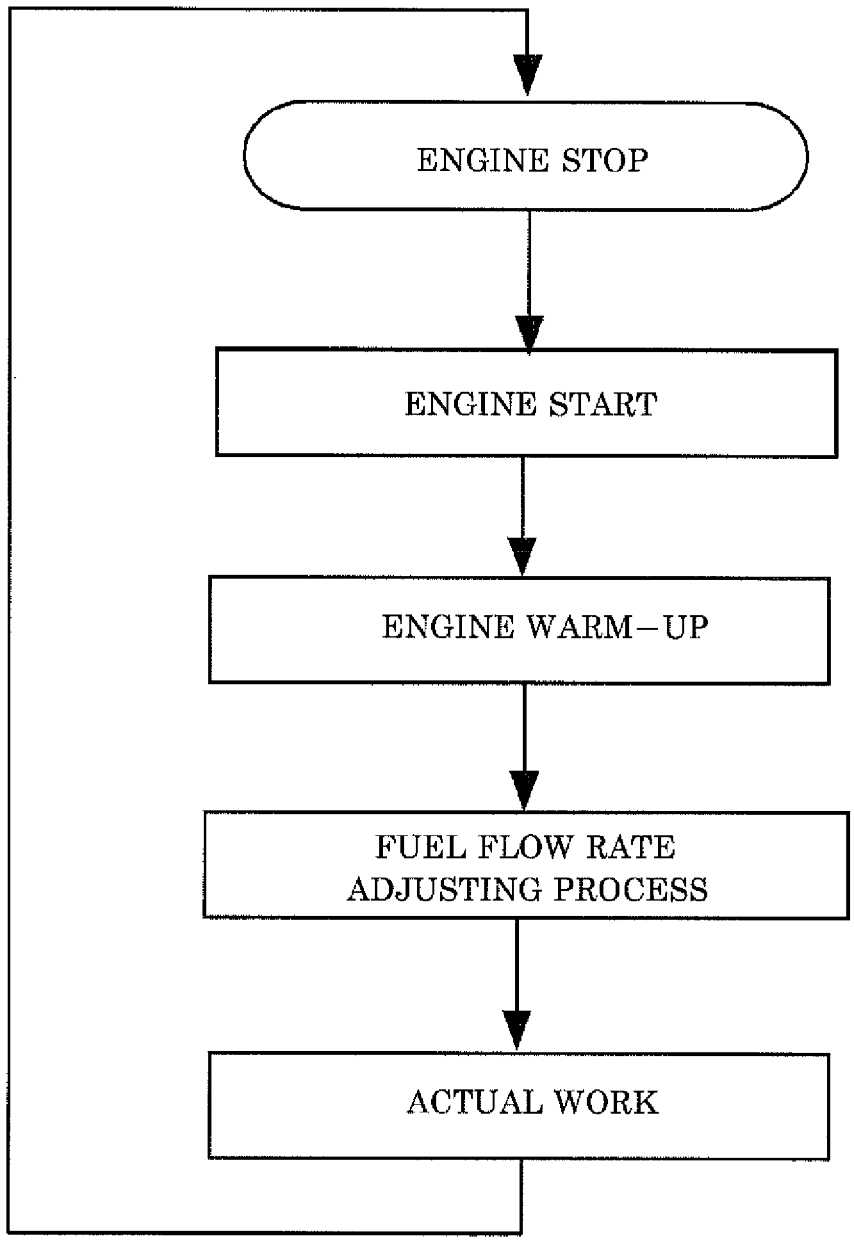
FIG. 2 is a flowchart representing a basic operation of the invention.

FIG. 2 is a flowchart showing a basic control flow of the invention. The flowchart shows that after the "start of the engine" and the completion of warming up of the engine, a "fuel flow rate adjusting process" (F.F.R.A.P.) is performed in which the fuel flow rate which has varied due to a working environment is adjusted by the solenoid valve 3 before the start of "actual work" and the "actual work" is started after the fuel adjustment is completed. The flowchart also shows that when the engine 7 is started again after the engine 7 stops once, a similar fuel adjustment is performed.

Figure 3:
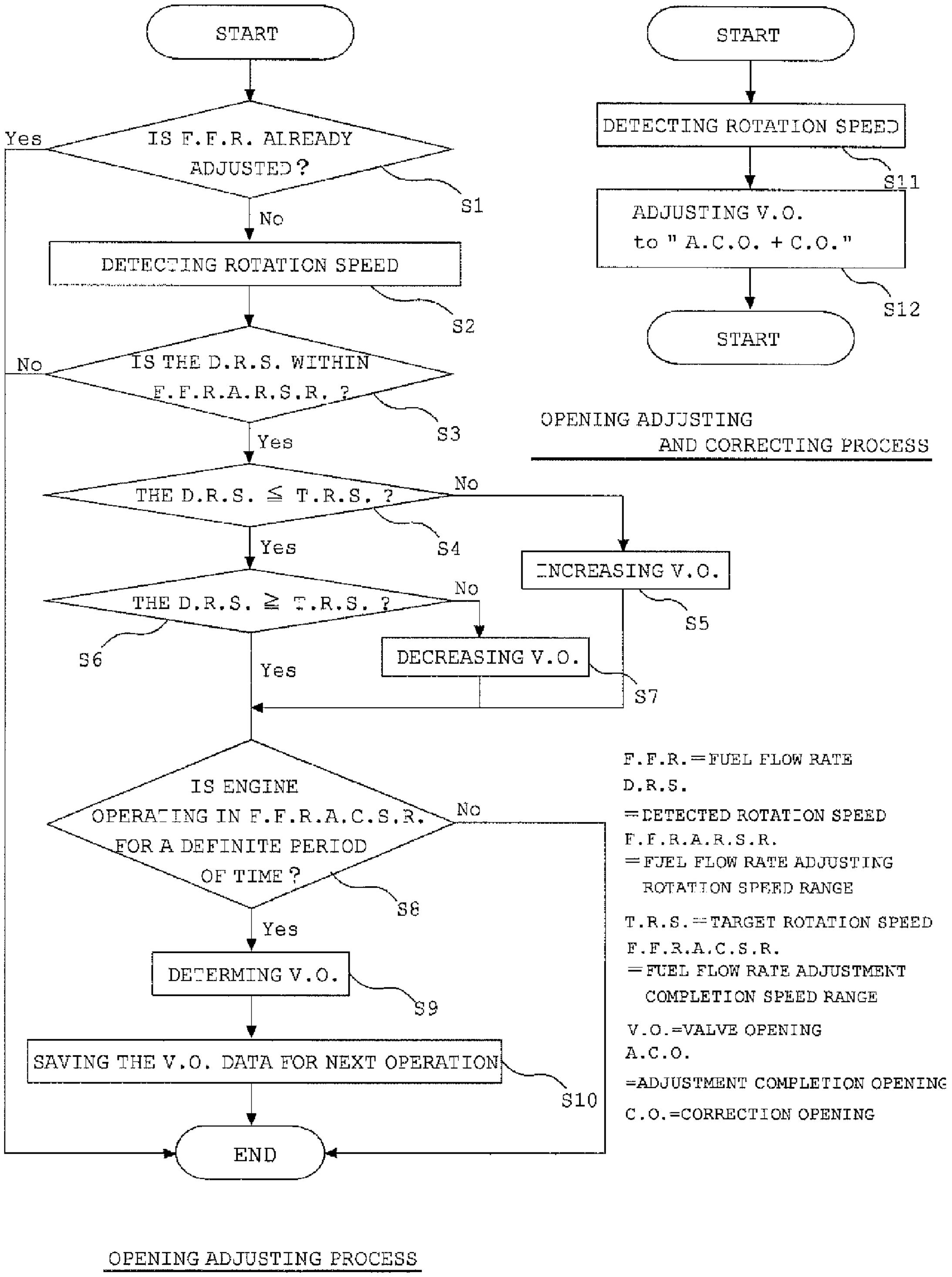
FIG. 3 is a flowchart showing a control algorithm according to an embodiment of the invention.

A left half of FIG. 3 shows a control algorithm performed per revolution of the engine 7 by the microcomputer in the control unit 8 in an "opening adjusting process". According to this control algorithm, when the "fuel flow rate adjusting process" (F.F.R.A.P.) is reached by opening the throttle valve 4 after the start of the engine 7, it is confirmed in step S1 that the "fuel flow rate adjusting process" (F.F.R.A.P.) has not yet been completed. In step S2, the current rotation speed is detected and referred to as a detected rotation speed. It is confirmed in step S3 that the detected rotation speed stays in a "fuel flow rate adjusting rotation speed range" (F.F.R.A.R.S.R.) which is a rotation speed range for adjusting the flow rate and set within a working rotation speed range. In steps S4 and S6, the "detected rotation speed" (D.R.S.) is compared with a "target rotation speed" (T.R.S.), and in steps S5 and S7, the opening of the solenoid valve 3 (hereinafter, referred to simply as a valve opening) is adjusted. Then, it is determined in step S8 whether or not the "detected rotation speed" (D.R.S.) stays within a "fuel flow rate adjustment completion speed range" (F.F.R.A.C.S.R.) for a definite period of time or for a definite number of turns or more of the engine. If it is determined then that the "detected rotation speed" (D.R.S.) has not yet stayed within the range for the definite period of time or for the definite number of turns or more of the engine, the opening adjusting process at this revolution is ended, and the opening adjusting process is performed similarly for the next revolution. On the other hand, if it is determined then that the detected rotation speed has stayed within the "fuel flow rate adjustment completion speed range" for the definite period of time or for the definite number of turns or more of the engine, the "valve opening" (V.O.) then is determined, in step S9, as an "adjustment completion opening" (A.C.O.). In step S10, the "adjustment completion opening" (A.C.O.) is saved in the microcomputer as an initial (starting) opening which is a valve opening for the next engine start.

Namely, in a definite loaded state including a no-load state, the solenoid valve 3 is controlled so as to attain a "target rotation speed" (T.R.S.) which is a rotation speed at which an optimal combustion is attained in that loaded state within the "fuel flow rate adjusting rotation speed range" (F.F.R.A.R.S.R.) in which the engine 7 opens the throttle valve 4, and the "detected rotation speed" (D.R.S.) is fed back to the control unit 8 to control the fuel flow rate. When the "detected rotation speed" (D.R.S.) is larger than the "target rotation speed" (T.R.S.), the "valve opening" (V.O.) is increased to increase the fuel consumption amount so that the "detected rotation speed" (D.R.S.) becomes the "target rotation speed" (T.R.S.). On the other hand, when the "detected rotation speed" (D.R.S.) is smaller than the "target rotation speed" (T.R.S.), the "valve opening" (V.O.) is decreased to decrease the fuel consumption amount so that the "detected rotation speed" (D.R.S.) is increased to the "target rotation speed" (T.R.S.). In this way, the fuel consumption amount in the definite loaded state is feedback controlled by the rotation speed data. In this feedback control, when the "detected rotation speed" (D.R.S.) continues to stay for the definite period of time or for the definite number of turns of the engine within the "fuel flow rate adjustment completion speed range" (F.F.R.A.C.S.R.) which is a predetermined rotation speed range by which it can be determined that the rotation speed is stabilized, the adjustment based on the feedback control is completed.

The "fuel flow rate adjusting process" (F.F.R.A.P.) is completed and the opening adjusting process (refer to the left half of FIG. 3) ends after the feedback control for fuel flow rate adjustment is completed immediately after the start of the engine 7. Although the "adjustment completion opening" (A.C.O.) which is the valve opening when the "opening adjusting process" is completed is held by the microcomputer until the engine 7 stops, when the rotation speed changes due to a change in load within the working rotation speed range in the actual working state, it is possible to correct the valve opening according to the change. Namely, at individual rotation speeds within the working rotation speed range, with the valve opening that is determined in step S9 and which continues to be held since the determination, when the rotation speed changes, the air-fuel mixture becomes too rich or lean, whereby no good operation is available.

Figure 4:
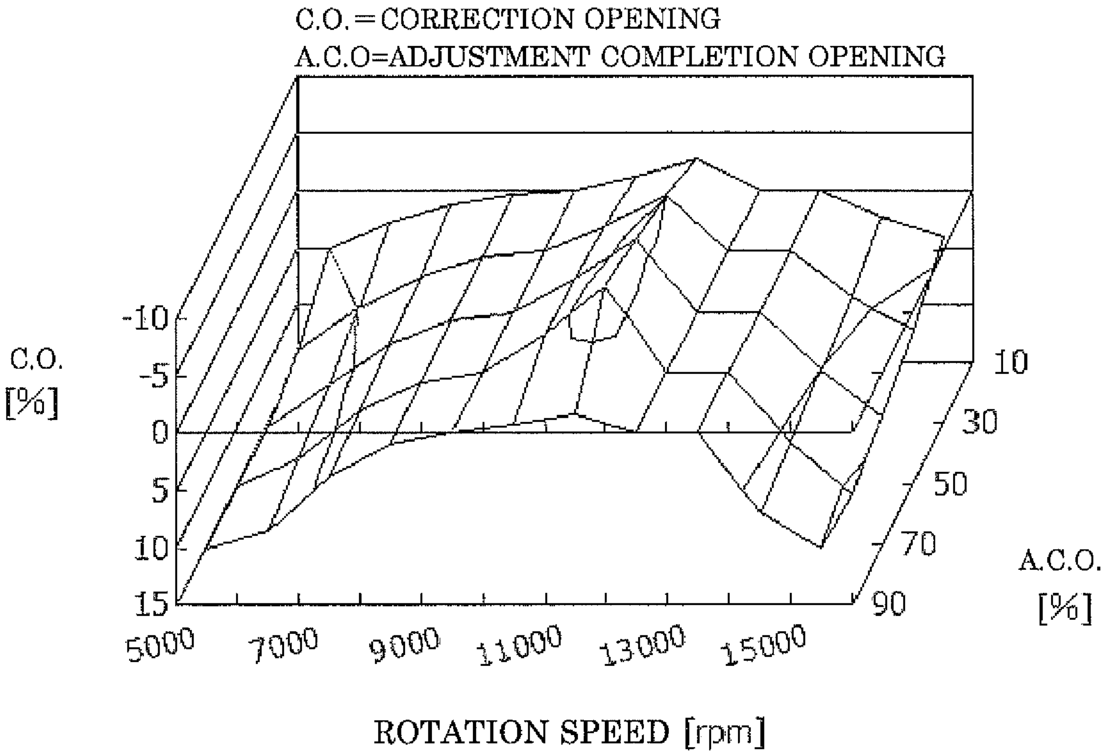
FIG. 4 is a three-dimensional graph showing that a "correction opening" (C.O.) is determined from an "adjustment completion opening" (A.C.O.) and a rotation speed of the engine.

Thus, in order to attain optimum combustion at each rotation speed, an "opening adjusting and correcting process" (right half of FIG. 3) needs to be further performed in which the determined valve opening which is the "adjustment completion opening" (A.C.O.) is corrected. FIG. 4 is a graph showing an example of data on a relationship between the "adjustment completion opening" (A.C.O.), the "rotation speed" and "correction opening" (C.O.) which enables the execution of the "opening adjusting and correcting process". The data shown by the graph in FIG. 4 is data resulting on the basis of the "adjustment completion opening" (A.C.O.) and "correction opening" (C.O.) determined so that an appropriate fuel flow rate is attained in a no-load state at 13000 rpm. At the other rotation speeds, the valve opening is corrected so as to attain an optimum fuel flow rate. Therefore, in step S12 in the "opening adjusting and correcting process", an appropriate correction opening for the valve opening in that state is determined from the valve opening determined by the adjustment in step S9 and the rotation speed.

As is clear from the data of the graph shown in FIG. 4, the "correction opening" (C.O.) is "0" at the target rotation speed (13000 rpm), where the valve opening=the "adjustment completion opening" (A.C.O.). When the detected rotation speed changes from the target rotation speed to, for example, 11000 rpm as a result of a change in load, the "correction opening" (C.O.) becomes "−7" when the "adjustment completion opening" (A.C.O.) is 50. Therefore, the valve opening becomes 43. In this way, the valve opening is determined by adding the "adjustment completion opening" (A.C.O.) obtained in step S9 to the "correction opening" (C.O.) determined in step S12 according to the data shown in FIG. 4. Namely, when the valve opening is corrected in association with the change in load, the rotation speed is detected in step S11, and the valve opening is set to the value in step S12 according to this detected rotation speed signal. By doing so, the engine can be driven with the optimum fuel flow rate over the whole of the working rotation speed range, thereby making it possible not only to maximize the output of the engine but also to reduce the exhaust emissions discharged from the engine.

Figure 5:
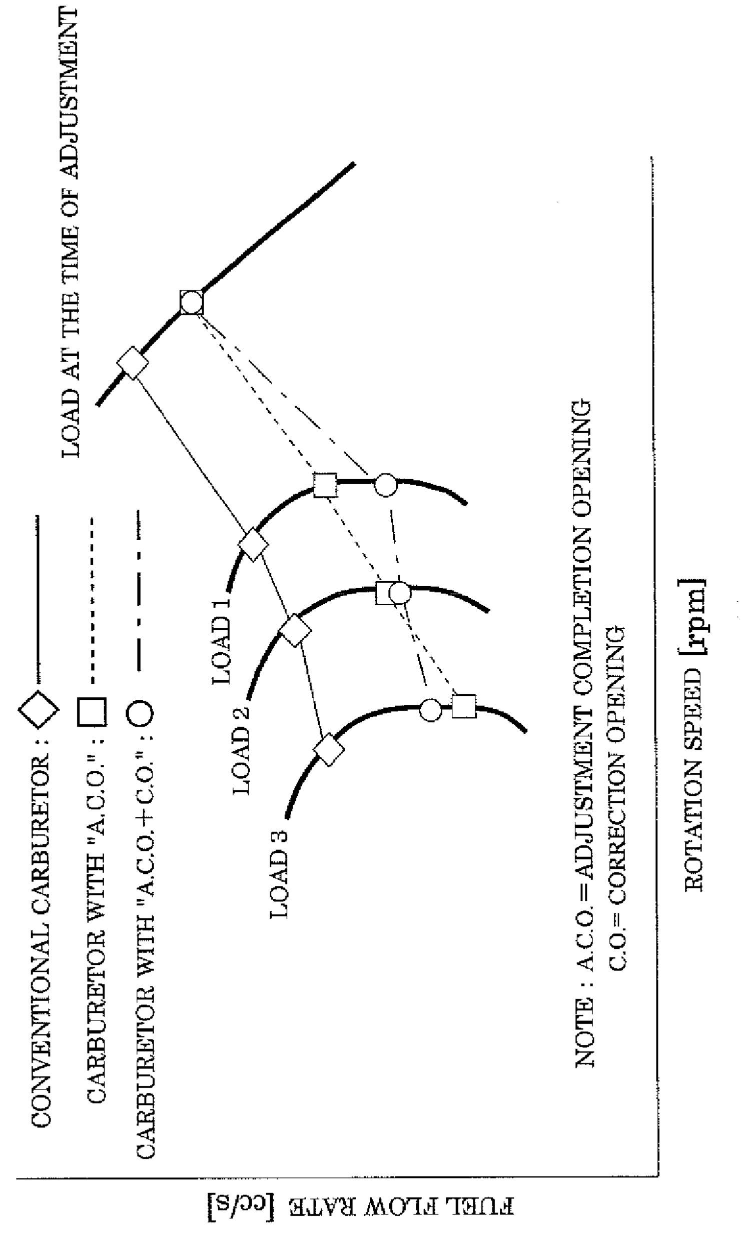
FIG. 5 is a graph showing a comparison of relation examples between a fuel flow rate and the rotation speed.

FIG. 5 is a diagram showing relationships between rotation speed and fuel flow rate in the working rotation speed range in three different states or carburetors: the conventional carburetor (indicated by rhombuses) to which the invention is not applied, the carburetor of the invention (indicated by quadrangles) to which the process of the "adjustment completion opening" (A.C.O.) is applied and the carburetor of the invention (indicated by circles) to which the process of the addition of the "correction opening" (C.O.) to the "adjustment completion opening" (A.C.O.) is applied. The diagram shows that by performing the "fuel flow rate adjusting process" (F.F.R.A.P.), the state of fuel can be made optimum under a "load at the time of adjustment" and a "load 2". In the case of the conventional carburetor, the fuel flow rate is increased, compared to the carburetors of the inventions. In the case of the carburetor of the invention to which the process of "valve opening=adjustment completion opening (A.C.O.)+correction opening (C.O.)" is applied, the fact is shown that even when the load changes, the engine can be driven with the optimum fuel flow rate.

Figure 6:
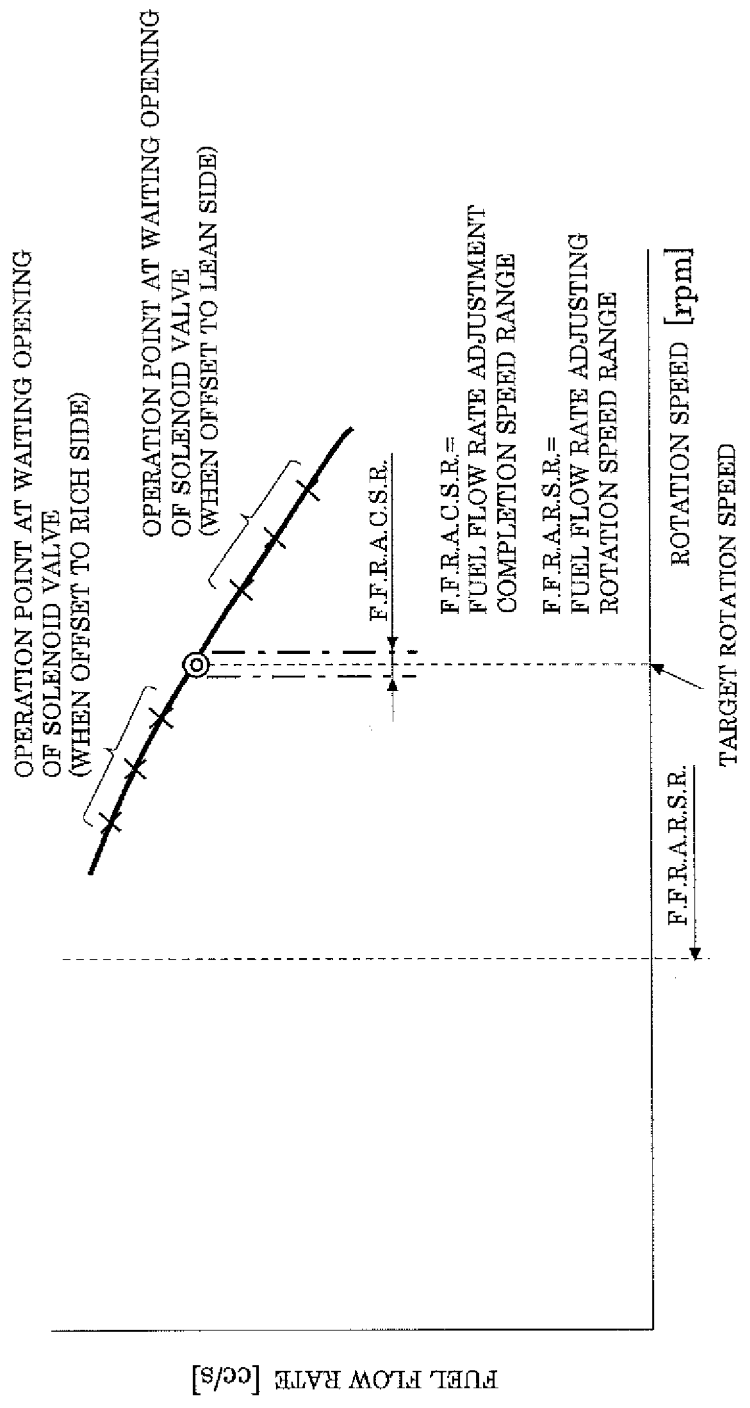
FIG. 6 is a diagram illustrating operations within a "fuel flow rate adjustment completion speed range".

FIG. 6 is a diagram showing a relationship between rotation speed and fuel flow rate in the "fuel flow rate adjusting process" (F.F.R.A.P.). The diagram specifically shows a relationship between rotation speed and fuel flow rate when the engine is driven under a definite load and at a definite throttle opening of the carburetor. Before the "fuel flow rate adjusting process" (F.F.R.A.P.) is performed, the rotation speed and the fuel flow rate at initial opening of the solenoid valve are offset towards the rich side or the lean side depending upon an environment where the working machine is used. Then, when the rotation speed comes into the "fuel flow rate adjusting rotation speed range" (F.F.R.A.R.S.R.), which is determined within the working rotation speed range as a speed range where the adjustment is performed in the "fuel flow rate adjusting process" (F.F.R.A.P.), the valve opening is adjusted so that the rotation speed becomes the target rotation speed which is the rotation speed which results when the engine is operated in the combustion state expected in the operation state where the engine is driven under the definite load and at the definite throttle opening of the carburetor. Then, when the rotation speed stays for the definite period of time or for the definite number of turns or more within the "fuel flow rate adjustment completion speed range" (F.F.R.A.C.S.R.) by which it can be judged that the engine is stably operated, the valve opening then is determined to be the "adjustment completion opening" (A.C.O.), and the "fuel flow rate adjusting process" (F.F.R.A.P.) is completed.

An actual simple operation example will be described below. The engine 7 is started and is then operated under a no-load state with the throttle valve 4 fully opened. Then, when the rotation speed reaches or exceeds 11000 rpm which is a lower limit of the "fuel flow rate adjusting rotation speed range" (F.F.R.A.R.S.R.), the feedback control is performed with the detected rotation speed. With the target rotation speed set to 13000 rpm, when the detected rotation speed is equal to or lower than the target rotation speed, the valve opening is decreased, whereas when the detected rotation speed exceeds the target rotation speed, the valve opening is increased so that the detected rotation speed is held constantly at the target rotation speed. In the "fuel flow rate adjusting process" (F.F.R.A.P.), in the event that the detected rotation speed stays within the "fuel flow rate adjustment completion speed range" (F.F.R.A.C.S.R.) which is set to be the range of 12500 rpm to 13500 rpm while the engine rotates 5000 turns when the temperature sensor 10 indicates a value of temperature at which the engine 7 is warmed up sufficiently, for example, 50°, the valve opening then is determined to be the "adjustment completion opening" (A.C.O.) and the "fuel flow rate adjusting process" (F.F.R.A.P.) is completed. When the rotation speed varies due to a change in load, a "correction opening" (C.O.) for the valve opening at each of the rotation speeds within the working rotation speed range is determined based on the value of the determined "adjustment completion opening" (A.C.O.) from the rotation speed by using a characteristic curve shown in FIG. 4.

Thus, as has been described heretofore, according to the fuel control method for a hand-carried engine-driven working machine of the invention, the opening of the solenoid valve is directly adjusted in the working rotation speed range, and therefore, an optimum fuel flow rate can be obtained in an ensured and stable fashion. Thus, the invention is expected to be used and deployed widely in the field of hand-carried engine-driven working machine on which high working efficiency is required.

What is claimed is:

1. A fuel control method for a hand-carried engine-driven working machine having an assembly of an engine and a carburetor which are mounted on the hand-carried engine-driven working machine, the carburetor having a solenoid valve which is provided along a fuel line thereof to control a fuel flow rate in a working rotation speed range of the engine, the engine having a control unit provided therein to detect a rotation speed of the engine and control the solenoid valve, the fuel control method for the hand-carried engine-driven working machine comprising steps:

performing a fuel flow rate adjusting process (F.F.R.A.P.) to adjust the fuel flow rate which is caused to vary based on a working environment by changing an opening of the solenoid valve after the engine is started and before actual work is performed;

in the fuel flow rate adjusting process (F.F.R.A.P), with the engine operated under a definite load and at a definite throttle opening, and when a detected rotation speed, which is current rotation speed, enters a fuel flow rate adjusting rotation speed range (F.F.R.A.R.S.R.) that is set for adjusting the fuel flow rate within the working rotation speed range, adjusting the opening of the solenoid valve by feeding back the detected rotation speed so that the detected rotation speed becomes a target rotation speed which is predetermined as a rotation speed at which an air-fuel ratio expected in that state is obtained, and when the detected rotation speed stays within a fuel flow rate adjustment completion speed range (F.F.R.A.C.S.R.) which is predetermined within the fuel flow rate adjusting rotation speed range while the engine rotates a definite number of turns or for a definite period of time, determining the opening of the solenoid valve to be an adjustment completion opening (A.C.O.); and performing actual work at the obtained adjustment completion opening (A.C.O.) after completing the fuel flow rate adjusting process (F.F.R.A.P.).

2. The fuel control method for the hand-carried engine-driven working machine according to claim 1, wherein when the detected rotation speed deviates from the target rotation speed in the actual work, the opening of the solenoid valve is adjusted to an opening which results from adding to the adjustment completion opening (A.C.O.) a correction opening (C.O.) which is determined from the adjustment completion opening (A.C.O.) obtained in the fuel flow rate adjusting process (F.F.R.A.P.) and the detected rotation speed.

3. The fuel control method for the hand-carried engine-driven working machine according to claim 1, comprising further:

a temperature sensor for detecting the temperature of the engine, wherein the fuel flow rate adjusting process (F.F.R.A.P.) is completed when it is determined from a value of the detected temperature detected by this temperature sensor that the engine is in a warm-up condition as a result of the adjustment in which the engine operates stably.

4. The fuel control method for the hand-carried engine-driven working machine according to claim 1, wherein the adjusting state of the fuel flow rate adjusting process (F.F.R.A.P.) is indicated by an indicator such as a lamp.

* * * * *